(12) United States Patent
Komiyama et al.

(10) Patent No.: US 11,794,380 B2
(45) Date of Patent: Oct. 24, 2023

(54) MOLDING MACHINE (71) Applicant: SINTOKOGIO, LTD., Nagoya (JP)

(72) Inventors: Takayuki Komiyama, Toyokawa (JP); Tomohiro Aoki, Toyokawa (JP)

(73) Assignee: SINTOKOGIO, LTD., Aichi (JP)

(*) Notice: Subject to any disclaimer, the term of this patent is extended or adjusted under 35 U.S.C. 154(b) by 0 days.

(21) Appl. No.: 17/172,389

(22) Filed: Feb. 10, 2021

(65) Prior Publication Data

US 2021/0291409 A1 Sep. 23, 2021

(30) Foreign Application Priority Data

Mar. 19, 2020 (JP) ................................. 2020-049925

(51) Int. Cl.
B29C 33/38 (2006.01)

(52) U.S. Cl.
CPC ................ B29C 33/3842 (2013.01)

(58) Field of Classification Search
CPC .... F16J 15/46; B29C 33/0038; B29C 45/2608
See application file for complete search history.

(56) References Cited

U.S. PATENT DOCUMENTS

| 3,012,977 | A |   | 12/1961 | Hutton |   |
|---|---|---|---|---|---|
| 3,142,477 | A |   | 7/1964 | Jouriles |   |
| 3,519,035 | A | * | 7/1970 | Remane | G01F 11/32 |
|   |   |   |   |   | 141/52 |
| 4,422,772 | A |   | 12/1983 | Baumgartner |   |
| 4,844,297 | A |   | 7/1989 | Smith |   |
| 5,209,498 | A | * | 5/1993 | Colin | E04B 2/82 |
|   |   |   |   |   | 277/921 |
| 5,261,745 | A |   | 11/1993 | Watkins |   |
| 6,230,938 | B1 |   | 5/2001 | Boers |   |
| 2015/0083837 | A1 |   | 3/2015 | Thienel et al. |   |
| 2018/0326381 | A1 |   | 11/2018 | Bradley et al. |   |
| 2018/0326473 | A1 |   | 11/2018 | Maegawa et al. |   |
| 2018/0355982 | A1 | * | 12/2018 | Veto | F16K 1/465 |
| 2021/0276076 | A1 |   | 9/2021 | Kato et al. |   |

FOREIGN PATENT DOCUMENTS

| EP | 3626363 | A1 |   | 3/2020 |   |
|---|---|---|---|---|---|
| GB | 2059836 | A |   | 4/1981 |   |
| GB | 2349673 | A | * | 11/2000 | F16J 15/46 |

(Continued)

OTHER PUBLICATIONS

English translation of WO-2018211785-A1 by EPO. (Year: 2018).*

(Continued)

Primary Examiner — Emmanuel S Luk
Assistant Examiner — Inja Song
(74) Attorney, Agent, or Firm — Harness, Dickey & Pierce, P.L.C.

(57) ABSTRACT

The present invention includes: an injection container unit; a lid member; and an ejection air supply section configured to press a foamed mixed material in the injection container unit with compressed air and thereby eject the foamed mixed material through an ejection port, the lid member being provided with a sealing body configured to deform when a fluid is injected and thereby make close contact with the inner circumferential surface of the injection container unit during the pressing.

5 Claims, 5 Drawing Sheets (56) References Cited

FOREIGN PATENT DOCUMENTS

| JP | S49-009382 U | 1/1974 | | |
|---|---|---|---|---|
| JP | S51-119310 U | 9/1976 | | |
| JP | S52-026316 A | 2/1977 | | |
| JP | S56-060561 U | 5/1981 | | |
| JP | S56-068552 A | 6/1981 | | |
| JP | S57-171545 A | 10/1982 | | |
| JP | S58-091433 U | 6/1983 | | |
| JP | S61-138451 U | 8/1986 | | |
| JP | H06-031378 A | 2/1994 | | |
| JP | H06-023643 U | 3/1994 | | |
| JP | 2002-239685 A | 8/2002 | | |
| JP | 2018-192512 A | 12/2018 | | |
| WO | WO-2018211785 A1 * | 11/2018 | ............. | B22C 15/08 |

OTHER PUBLICATIONS

Sigma, "Glass reactor system," published in public on Aug. 18, 2018, available at https://web.archive.org/web/20180818094433/http://sigmaglassindia.com/products/glass-reactor-system/). (Year: 2018).*
DeDietrich (Blog, available at https://www.ddpsinc.com/blog/benefits-of-glass-and-glass-lined-steel-reactors, published in public on Mar. 29, 2018) (Year: 2018).*
U.S. Appl. No. 17/172,397, filed Feb. 10, 2021.
U.S. Office Action for corresponding U.S. Appl. No. 17/172,397 dated Apr. 8, 2022.
U.S. Notice of Allowance for corresponding U.S. Appl. No. 17/172,397 dated Sep. 7, 2022.
Office Action for corresponding Japanese Patent Application No. 2020-049925 dated Jan. 17, 2023 and English translation thereof.
Office Action for corresponding Japanese Patent Application No. 2020-049926 dated Jan. 31, 2023 and English translation thereof.

* cited by examiner

MOLDING MACHINE

This Nonprovisional application claims priority under U.S.C. § 119 on Patent Application No. 2020-049925 filed in Japan on Mar. 19, 2020, the entire contents of which are hereby incorporated by reference.

TECHNICAL FIELD

The present invention relates to a molding machine configured to form a mold by injecting a foamed mixed material into a cavity of a heated mold and filling the cavity of the heated mold.

BACKGROUND ART

In recent years, there has been a proposal to form a mold in the following manner, because such a mold is easily breakable after casting: a water-soluble binder is used as a binding agent to bind aggregate particles; the water-soluble binder is allowed to solidify by evaporating water with heat; and thereby the mold is formed.

For example, Patent Literature 1 discloses a molding machine configured such that: a foamed mixture which is a material for the above-mentioned mold is produced; and the foamed mixture is injected by air into a cavity of a mold. The molding machine of Patent Literature 1 includes: a chamber which has, in the bottom thereof, a through-hole through which the material is filled into the cavity; a stopper mechanism which opens and closes the through-hole; and a lid member which hermetically closes an opening of the chamber. The molding machine further includes: a stirring mechanism provided with a stirring blade in a lower part thereof; and a compressed air supplying mechanism which supplies compressed air into the chamber when the foamed mixture is filled into the cavity of the mold through the through-hole.

CITATION LIST

Patent Literature

[Patent Literature 1]
Japanese Patent Application Publication, Tokukai, No. 2018-192512

SUMMARY OF INVENTION

Technical Problem

In the molding machine disclosed in Patent Literature 1, a sealing body provided on the circumferential surface of the lid member slides on the inner circumferential surface of the chamber when the chamber is closed by fitting the lid member and when the chamber is opened by withdrawing the lid member. Therefore, the sealing body is likely to wear away and deteriorate. The fact that the sealing body is likely to wear away and deteriorate results in, for example, an increase in the number of man-hours for maintenance.

An object of an aspect of the present invention is to provide a molding machine in which a sealing body provided on the circumferential surface of a lid member is not prone to wear-related deterioration.

Solution to Problem

In order to attain the above object, a molding machine in accordance with an aspect of the present invention includes: an injection container unit configured to store a foamed mixed material; a lid member configured to open and close an opening at a top of the injection container unit; and an air supplying section configured to supply air into the injection container unit to thereby eject the foamed mixed material through an ejection port in the injection container unit, the lid member having a circumferential surface on which a sealing body is provided, the sealing body being configured to (i) inflate when supplied with a fluid and thereby make close contact with an inner circumferential surface of the injection container unit and (ii) detach from the inner circumferential surface of the injection container unit when the fluid stops being supplied.

Advantageous Effects of Invention

An aspect of the present invention makes it possible to provide a molding machine in which a sealing body provided on the circumferential surface of a lid is not prone to wear-related deterioration.

DESCRIPTION OF EMBODIMENTS

The following description will discuss a molding machine in accordance with an embodiment of the present invention in detail.

(1) Overall Configuration of Molding Machine 1

Figure 1:
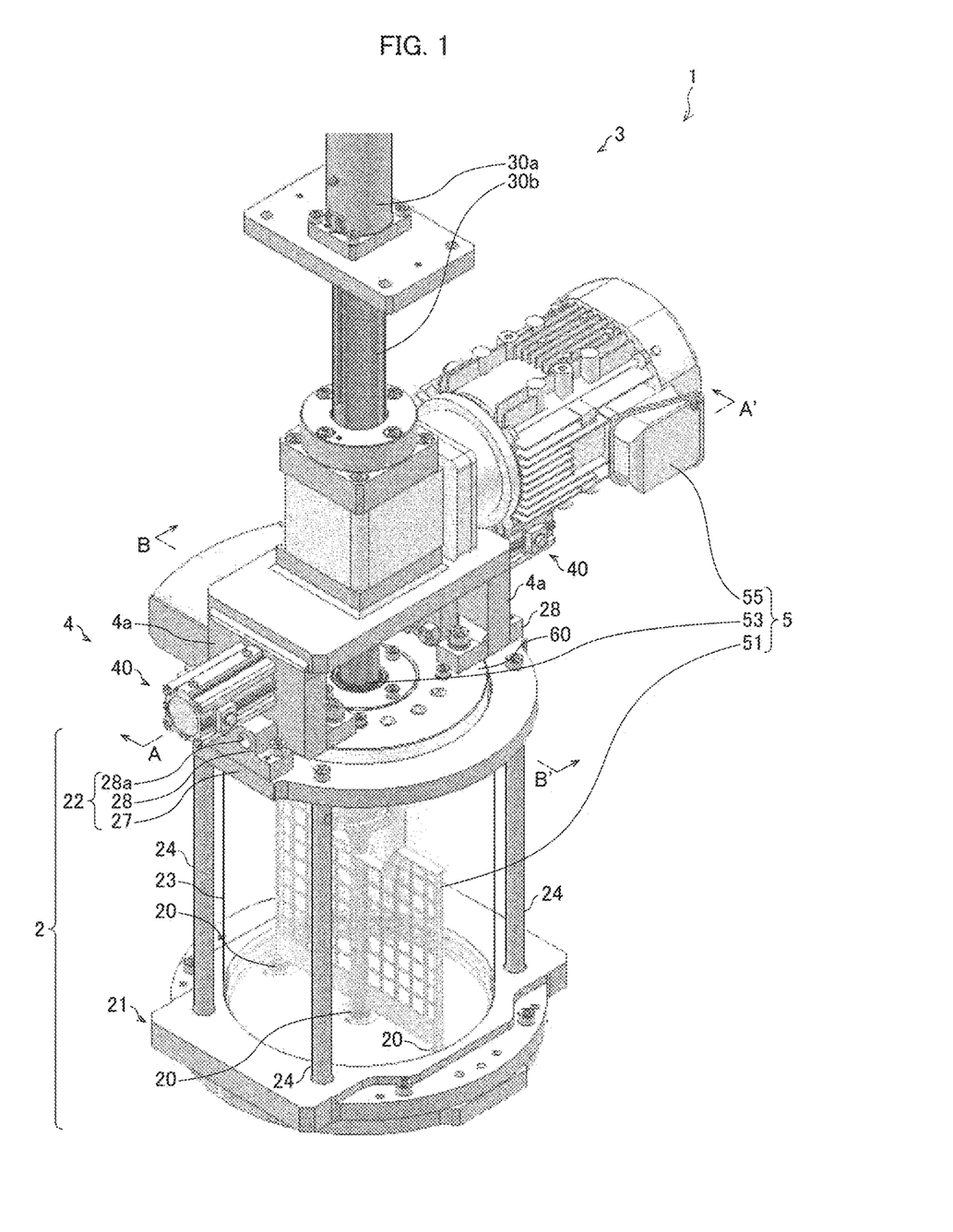
FIG. 1 is a perspective view of an injection container unit and its vicinity of a molding machine in accordance with an embodiment of the present invention.
Figure 2:
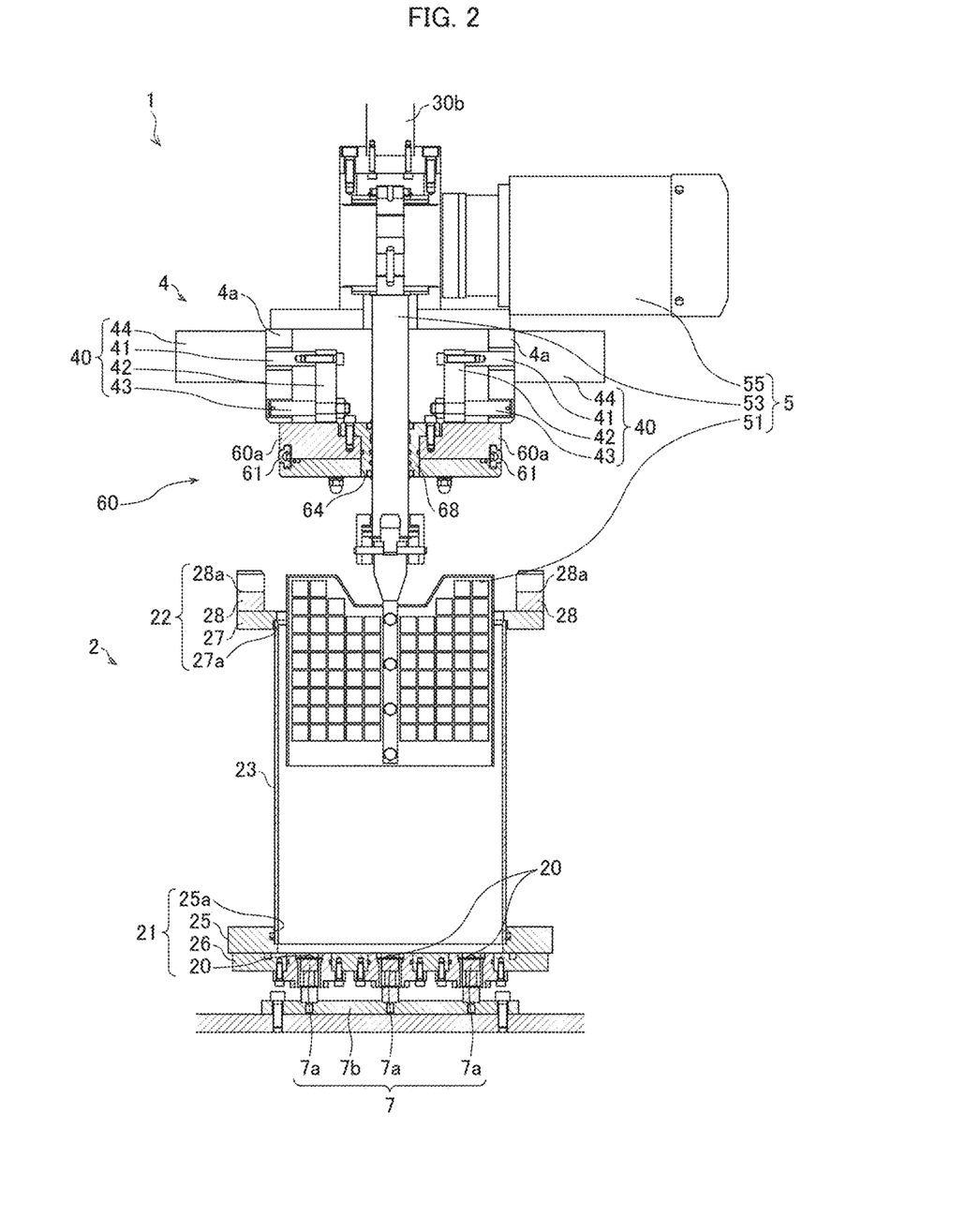
FIG. 2 is a cross-sectional view of the injection container unit and its vicinity of the molding machine illustrated in FIG. 1.

FIG. 1 is a perspective view of a configuration of an injection container unit and its vicinity of a molding machine 1 in accordance with the present embodiment. FIG. 2 is a cross-sectional view of the molding machine 1 taken along line A-A' in FIG. 1. The molding machine 1 can be used in a process of forming a mold by injecting a material into a cavity of a mold and filling the cavity of the mold. The molding machine 1 can be used especially suitably in a process of forming a core with use of, as a molding material, a foamed mixed material obtained by mixing particulate aggregate, a water-soluble binder, a surfactant, and water.

As illustrated in FIG. 1, the molding machine 1 includes: an injection container unit 2 configured to store a foamed mixed material; a lid member 60 configured to open and close an opening at the top of the injection container unit 2; and an ejection air supply section 65*b* (FIG. 3) configured to supply air into the injection container unit 2 to thereby eject the foamed mixed material through one or more ejection ports 20 in the bottom of the injection container unit 2. The molding machine 1 further includes a sealing body 61 (e.g., inflatable seal) which is provided on a circumferential surface 60*a* of the lid member 60 and which is configured to inflate when supplied with a fluid and thereby make close contact with the inner circumferential surface of the injection container unit 2. The sealing body 61 is configured to detach from the inner circumferential surface of the injection container unit 2 when the fluid stops being supplied. The ejection air supply section 65b supplies, for example, compressed air; however, the ejection air supply section 65b may supply uncompressed air.

The molding machine 1 further includes, as illustrated in FIG. 1, a stirring mechanism 5, a sealing air supply section 65a (FIG. 3), a vertically driving mechanism 3, and a connector unit 4. The molding machine 1 further includes, as illustrated in FIG. 2, a stopper mechanism 7 configured to close the ejection ports 20 of the injection container unit 2. The molding machine 1 further includes, as illustrated in (iii) of FIG. 5 (described later), a mold 11 configured to receive the foamed mixed material ejected from the ejection ports 20.

(2) Details of Constituents of Molding Machine 1

The injection container unit 2 is a container in which materials (molding material) are mixed to produce a foamed mixed material and which is configured to store the produced foamed mixed material until the foamed mixed material is ejected. The injection container unit 2 includes: a lower unit 21 which has the ejection ports 20; an upper unit 22 which is located opposite the lower unit 21; and a lateral part 23 which is present between the lower unit 21 and the upper unit 22 and which is composed of a transparent material. The lateral part 23 is in the form of a cylinder, and the opening at the bottom thereof is sealed by the lower unit 21. The lower unit 21 thereby serves as the base of the container, and the lateral part 23 is capable of accommodating the foamed mixed material therein. As illustrated in FIG. 1, the injection container unit 2 includes a plurality of struts 24 which are provided outside the lateral part 23 and which connect the lower unit 21 and the upper unit 22.

As illustrated in FIG. 2, the lower unit 21 includes: a lower flange 25 which has a shape projecting outward from the vicinity of the outer periphery of the lateral part 23; and an ejection plate body 26 present below the lower flange 25. The lower flange 25 has an opening 25a whose diameter is slightly greater than the outer diameter of the lateral part 23. The lower flange 25 is connected to the lateral part 23 by a bottom end portion of the lateral part 23 being fitted into the opening 25a. The ejection plate body 26 is connected to the lower surface of the lower flange 25, and the upper surface of the ejection plate body 26 is partially exposed inside the container. This exposed portion constitutes the upper surface of the base of the container of the injection container unit 2. The ejection ports 20 are through-holes in the ejection plate body 26. The number of the ejection ports is, for example, three, as illustrated in FIG. 1. The number of the ejection ports 20 is not limited to three. The ejection ports 20 may each be provided with a valve structure which prevents the foamed mixed material from leaking out. The valve structure may be, for example, a well-known valve structure made of rubber.

The lower unit 21 has a double-layer structure, and therefore can have a certain degree of thickness. The lower unit 21 thus contributes to improving the rigidity of the injection container unit 2. The lower flange 25 and the ejection plate body 26 are each preferably composed of a material which has an alkali resistance and from which mixed sand is easily detached. The lower flange 25 and the ejection plate body 26 can each be composed of, for example, a metal such as stainless steel, a fluorocarbon resin such as PTFE, or the like. In a case where the lower flange 25 and the ejection plate body 26 are each composed of a metal, the rigidity is further improved. The lower flange 25 and the ejection plate body 26 may be composed of the same material or may be composed of different materials.

As illustrated in FIGS. 1 and 2, the upper unit 22 includes an upper flange 27 which has a shape projecting outward from the vicinity of the outer periphery of the lateral part 23. As illustrated in FIG. 2, the upper flange 27 has an opening 27a whose diameter is slightly greater than the outer diameter of the lateral part 23. The upper flange 27 is connected to the lateral part 23 by a top end portion of the lateral part 23 being fitted into the opening 27a. The upper flange 27 can be composed of a metal such as stainless steel or a fluorocarbon resin such as PTFE. Note, however, that the material for the upper flange 27 is not limited to those mentioned above. The upper flange 27 has a certain degree of thickness, and thereby contributes to improving the rigidity of the injection container unit 2. In a case where the upper flange 27 is composed of a metal, the rigidity is further improved.

The upper flange 27 of the upper unit 22 has clamping bushings 28 connected to the upper surface thereof. The clamping bushes 28 are located at two positions opposite each other with the central axis of the injection container unit 2 between them, and each have one or more holes 28a for insertion of one or more clamping pins 43 (described later). The clamping bushes 28 and the clamping pins 43 (described later) constitute a part of the connector unit 4. The clamping bushes 28 may be composed of the same material as that for the upper flange 27 or a different material from that for the upper flange 27.

As illustrated in FIG. 1, the struts 24 are connected to the lower unit 21 and the upper unit 22. The struts 24 are preferably each composed of a metal, as with the lower unit 21 and the upper unit 22. With this configuration, the struts 24, together with the lower unit 21 and the upper unit 22, can contribute to improving the rigidity of the injection container unit 2. Furthermore, the struts 24 keep the distance between the lower unit 21 and the upper unit 22 constant. In the present embodiment, the number of the struts 24 is four in total, and these four struts 24 are provided along the outer circumference of the lateral part 23 and are equally spaced apart from each other. Note that the number of the struts 24 is not limited to four.

The lateral part 23 is fixed to the lower unit 21 and the upper unit 22, and constitutes the side wall of the container for accommodating the foamed mixed material. The lateral part 23 is composed of a transparent material. This makes it possible to clearly observe the inside of the injection container unit 2. The observation makes it possible to check changes and the amount of mixed sand, and also possible to check whether or not there are deposits that should be removed during cleaning of the injection container unit 2 and check whether the deposits remain or not during the cleaning. It is also possible to check whether or not sealing with the sealing body 61 (described later) has been done. The transparent material can be a transparent thermoplastic resin (so-called "plastic"). In particular, the transparent material is preferably selected from the group consisting of rigid plastics such as acrylic resin, polycarbonate, vinyl chloride, and polystyrene.

The lateral part 23 need only be strong enough to withstand the weight of the accommodated foamed mixed material and an internal pressure applied during injection and filling. The rigidity of the injection container unit 2 can be achieved by the lower unit 21, the upper unit 22, and the struts 24. Therefore, the lateral part 23 can be made relatively thin, provided that the lateral part 23 can withstand the internal pressure.

The stirring mechanism 5 mixes materials supplied to the injection container unit 2. As illustrated in FIG. 2, the stirring mechanism 5 includes a stirring blade 51, a stirring shaft 53, and a stirring motor 55. The stirring shaft 53 is disposed vertically. The stirring blade 51 is provided at the lower end of the stirring shaft 53. The stirring shaft 53 has the stirring motor 55 connected thereto. The stirring motor 55 drives the stirring blade 51 to rotate. The stirring mechanism 5 mixes the materials in the injection container unit 2 with the stirring blade 51. The materials (particulate aggregate, water-soluble binder, surfactant, and water) are introduced into the injection container unit 2 from, for example, respective supplying mechanisms (not illustrated).

Examples of the materials include artificial sand (e.g., ESPEARL) as particulate aggregate, sodium silicate as a water-soluble binder, an anionic surfactant as a surfactant, and water. The materials are not limited to those mentioned above, and may include some other additive(s) or the like.

The lid member 60 has the circumferential surface 60a, which is configured to face the inner circumferential surface of the upper unit 22-side opening of the injection container unit 2. The circumferential surface 60a is provided with the sealing body 61.

The sealing body 61 is capable of deforming radially (in radial directions which are directions going away from the center of the lid member 60 toward the circumferential surface 60a). When the sealing body 61 is deformed radially, a ridge of the sealing body 61 makes close contact with the inner circumferential surface of the injection container unit 2 and thereby hermetically closes the opening at the top of the injection container unit 2. In other words, when the sealing body 61 is in undeformed state, there is a gap between the sealing body 61 and the inner circumferential surface of the injection container unit 2. The sealing body 61 is deformed by sending, under pressure, air from the sealing air supply section 65a to a hollow in the sealing body 61. When the opening at the top of the injection container unit 2 is closed by the lid member 60 and the sealing body 61 is brought into close contact with the inner circumferential surface of the injection container unit 2, the inside of the injection container unit 2 is brought into a hermetically closed state. While the inside of the injection container unit 2 is in the hermetically closed state, when air is sent under pressure by the ejection air supply section 65b into the injection container unit 2, the foamed mixed material in the injection container unit 2 is pressed by compressed air and is ejected through the ejection ports 20.

Figure 3:
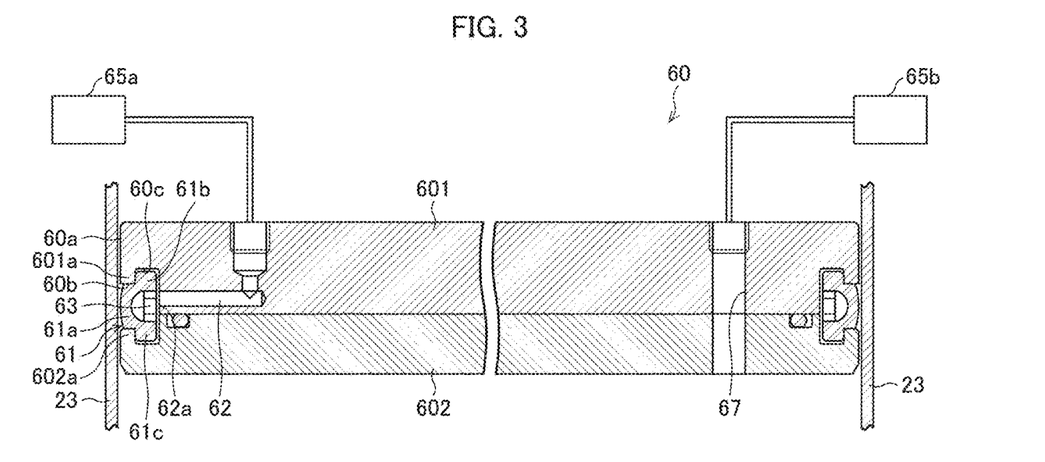
FIG. 3 is a cross-sectional view of a sealing body of the molding machine illustrated in FIG. 1.

The following description will discuss a configuration of the circumferential surface 60a of the lid member 60 in detail with reference to FIG. 3. FIG. 3 is a cross-sectional view taken along line B-B' in FIG. 1, and is an enlarged cross-sectional view illustrating the circumferential surface 60a of the lid member 60 and its vicinity.

The lid member 60 has, in the circumferential surface 60a thereof, a recess 60b for placement of the sealing body 61. The recess 60b extends along the circumferential direction of the lid member 60. The sealing body 61 includes (i) a sealing portion 61a which, in cross-section, is convex toward the inner circumferential surface of the injection container unit 2 and (ii) mounting portions 61b and 61c located at the opposite edges of the sealing portion 61a. The mounting portions 61b and 61c are located at the opposite edges of the sealing portion 61a in the vertical direction. The recess 60b is configured to have the sealing portion 61a placed therein except for a convex portion of the sealing portion 61a such that the convex portion is exposed, and is configured to abut on the mounting portions 61b and 61c so that the mounting portions 61b and 61c are restricted from moving toward the inner circumferential surface of the injection container unit 2. In other words, the recess 60b is configured to have the sealing body 61 accommodated therein except for the exposed portion of the sealing body 61. The sealing portion 61a, in cross-section, is in the shape of a curve convex in a radial direction of the lid member 60 (direction indicated by arrow in FIG. 3). The mounting portions 61b and 61c can be said to be flanges located at the opposite edges of the sealing portion 61a. The sealing body 61 is placed in the recess 60b in the circumferential surface 60a except for the peak portion of the curve (in cross-section) of the sealing portion 61a such that the peak portion of the curve of the sealing portion 61a is exposed. The recess 60b has a large-diameter portion 60c which corresponds to the mounting portions 61b and 61c and whose diameter in the vertical direction is larger than the other portion of the recess. The mounting portions 61b and 61c are fitted in the large-diameter portion 60c with a gap between the mounting portions 61b and 61c and the inner circumferential surface of the large-diameter portion 60c. In a place which corresponds to the bottom of the recess 60b, there is an opening 62a that constitutes one end of a flow path 62 provided in the lid member 60. The flow path 62 has the sealing air supply section 65a connected to the other end thereof, through which air is supplied toward the opening 62a or the supply of the air is stopped. When air is supplied from the opening 62a to a hollow defined by the opening 62a and the curved sealing portion 61a, the ridge of the sealing portion 61a inflates and deforms in radial directions of the lid member 60. The portion of the lid member 60 where the recess 60b does not have the large diameter (the circumferential surface 60a-side portion of the recess 60b) can be expressed as follows: walls 601a and 602a whose height is parallel to the vertical direction are present all around the perimeter of the lid member 60. The presence of the walls 601a and 602a prevents the mounting portions 61b and 61c of the sealing body 61 from moving toward the inner circumferential surface of the injection container unit 2.

When air stops being supplied to the hollow in the sealing body 61, the sealing portion 61a regains its original state (state before the inflation). That is, the lid member 60, which has an increased diameter because of the sealing body 61, decreases in diameter. In other words, when the air stops being supplied, the sealing body 61 detaches from the inner circumferential surface of the injection container unit 2.

In the step of ejecting the foamed mixed material form the injection container unit 2, the sealing body 61 deforms (inflates) in order to hermetically close the injection container unit 2. The sealing body 61 deforms (inflates) and hermetically closes the injection container unit 2 also during mixing, in order to prevent or reduce the shaking of the injection container unit 2 resulting from mixing. The injection container unit 2 is placed on a stopper plate 7b during mixing, as described later. When the stirring blade 51 rotates, vibration occurs and may shake the injection container unit 2. To address this, at the upper unit-side of the injection container unit 2, the sealing body 61 is inflated to closely contact the injection container unit 2, and thereby the shaking of the injection container unit 2 can be prevented or reduced.

The sealing body 61 is not in contact with the inner circumferential surface of the injection container unit 2 except during the step of ejecting the foamed mixed material and during mixing. The sealing body 61 does not contact the inner circumferential surface until the lid member 60 is lowered from above in order to hermetically close the injection container unit 2 and the circumferential surface 60*a* faces a predetermined area of the inner circumferential surface of the injection container unit 2. That is, the sealing body 61 does not slide on the inner circumferential surface of the injection container unit 2. Similarly, also when the lid member 60 is moved out of the hermetically closing position, the sealing body 61 does not slide on the inner circumferential surface of the injection container unit 2.

As such, the present embodiment is configured such that the sealing body 61 does not slide on the inner circumferential surface of the injection container unit 2. This provides a molding machine 1 in which the sealing body 61 and the injection container unit 2 do not get scratched from sliding and are not prone to deterioration.

Furthermore, the use of such a lid member 60 with the sealing body 61 eliminates the need for highly accurate centering of the lid member 60 when placing the lid member 60 on top of the injection container unit 2. This is because the lid member 60 is configured to increase in diameter via inflation of the sealing body 61. Even if the clearance between the circumferential surface 60*a* of the lid member 60 and the inner circumferential surface of the injection container unit 2 differs from one position in the circumferential direction to another, such differences can be canceled by the inflation of the sealing body 61, making it possible to appropriately seal the entire perimeter of the opening of the injection container unit 2.

The sealing body 61 is composed of an elastically deformable material. Typical examples of the material that can be employed include rubbers which are excellent in tensile strength, wear resistance, and chemical resistance. In particular, in terms of achieving easy centering, materials which have high elasticity and have relatively low hardness (i.e., soft) are preferred. The rubber hardness, e.g., measured with a durometer Type A (Shore A) (JIS standard), of the sealing body 61 is preferably A20 to A70. The elastic modulus (Young's modulus) of the sealing body 61 is preferably about 1 MPa to 6 MPa. Specifically, for example, the sealing body 61 is preferably composed of one selected from nitrile rubber, chloroprene rubber, butyl rubber, natural rubber, and the like.

Figure 4:
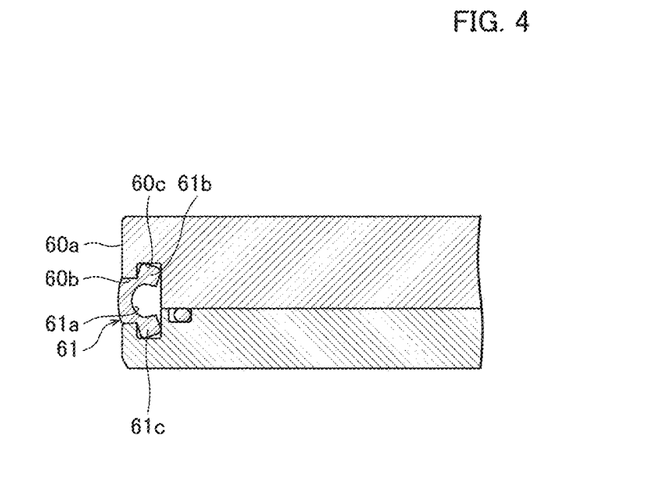
FIG. 4 illustrates a variation of the sealing body illustrated in FIG. 3.

The mounting portions 61*b* and 61*c* of the sealing body 61 are placed in the large-diameter portion 60*c* of the recess 60*b*. For example, the mounting portions 61*b* and 61*c* are fitted in the large-diameter portion 60*c* with an appropriate gap between the mounting portions 61*b* and 61*c* and the inner circumferential surface of the large-diameter portion 60*c*. FIG. 4 is a cross-sectional view of a variation of the sealing body 61 illustrated in FIG. 3. In FIG. 4, one mounting portion (upper mounting portion, i.e., the mounting portion 61*b*) and the other mounting portion (lower mounting portion, i.e., the mounting portion 61*c*) have a space between them. Therefore, in the aspect illustrated in FIG. 4, when the sealing body 61 inflates when supplied with air, the mounting portions 61*b* and 61*c* may be displaced and the sealing body 61 may not regain its original state even after the supply of air is stopped.

In view of this, in the present embodiment, as illustrated in FIG. 3, a spacer 63 is present in the space which is illustrated in FIG. 4. The spacer 63 is a ring-shaped structure which extends along the circumferential direction of the lid member 60. The spacer 63 has therein a vent through which air is supplied. Note that the spacer 63 may be composed of, for example, a porous material. The spacer 63 makes it possible to prevent the mounting portions 61*b* and 61*c* from deforming excessively and falling out of the recess 60*b* when the sealing body 61 deforms. It is also possible to eliminate the likelihood that the mounting portions 61*b* and 61*c* will be displaced and the sealing body 61 will not regain its original state after the supply of air is stopped. As is apparent from above, the presence of the spacer 63 makes it possible to achieve a sealing body 61 in which inflation necessary for sealing is ensured and in which the mountability to the lid member 60 is also improved. Such a spacer 63 is preferably composed of a material that is harder than the sealing body 61. As used herein, the phrase "harder than the sealing body 61" does not necessarily mean that the rubber hardness evaluated in terms of Type A is higher than that of the sealing body 61. It is only necessary that the hardness evaluated in terms of a certain standard be higher than that of the sealing body 61, e.g., the rubber hardness evaluated in terms of Type D be higher than that of sealing body 61 or the rubber hardness evaluated in terms of Type E be higher than that of sealing body 61. Examples of the material harder than the sealing body 61 include rubber, acrylic resin, ABS resin, polystyrene, Duracon (registered trademark) resin, and the like. Note that the aspect illustrated in FIG. 4 is also included in the scope of an embodiment of the present invention. Note that the spacer 63 may be a ring-shaped material radially outwardly extendable when attached and detached.

The lid member 60 can be constituted by two partial members, i.e., partial members 601 and 602, which are arranged on top of each other. The upper partial member 601 and the lower partial member 602 have respective recesses in their surfaces facing each other. These recesses together constitute the recess 60*b*. When maintenance operations are carried out, e.g., when the lid member 60 is cleaned, the sealing body 61 and the spacer 63 can be easily removed by making a gap between the two partial members 601 and 602 of the lid member 60. It is also easy to mount the sealing body 61 to the lid member 60 for the first time. The upper partial member 601 is preferably composed of a metal such as iron, for ensuring the rigidity of the lid. The lower partial member 602 is preferably composed of a lightweight, wear-resistant material, in consideration that the partial member 602 has a face facing toward the inside of the injection container unit 2 and therefore needs to be cleaned sometime. The lower partial member 602 can be composed of, but is not limited to, for example, fluorocarbon resin.

The lid member 60 has a stirring shaft insertion hole 64 having a bearing 68 through which the stirring shaft 53 (having the stirring blade 51 at the lower end thereof) is inserted (FIG. 2). The ascending or descending movement of the lid member 60 and the ascending or descending movement of the stirring shaft 53 and the stirring blade 51 are together driven and controlled by the vertically driving mechanism 3 (FIG. 1).

The sealing air supply section 65*a* supplies air to the foregoing hollow in the sealing body 61. Specifically, the sealing air supply section 65*a* is connected to the other end of the flow path 62 in the lid member 60, and, in the step of ejecting the foamed mixed material from the injection container unit 2 through the ejection ports 20, supplies air to the foregoing hollow in order to cause the sealing body 61 to deform. This results in a state in which the opening at the top of the injection container unit 2 is closed and the injection container unit 2 is hermetically closed.

With regard to the supply of air to the sealing body 61, the sealing air supply section 65*a* includes, in the lid member 60, a port and a pressure gauge (which are not illustrated). The port has a compressed air supply device coupled thereto via a hose, a flowmeter, and a three-way valve. The compressed air supply device is capable of supplying compressed air to the sealing body 61 via the flowmeter, the three-way valve, the hose, and the port. The pressure gauge measures the pressure inside the hollow in the sealing body 61.

The sealing air supply section 65a also includes an air supply control section connected to the pressure gauge, the flowmeter, the three-way valve, and the compressed air supply device. The air supply control section controls the operations of the compressed air supply device and the three-way valve to supply air to the sealing body 61 and stop supplying air to the sealing body 61.

The ejection air supply section 65b supplies air into the injection container unit 2. Specifically, as illustrated in FIG. 3, the ejection air supply section 65b is connected to an introduction tube 67 provided in the lid member 60, and is capable of supplying air into the injection container unit 2 through the introduction tube 67. The ejection air supply section 65b is configured to supply air into the injection container unit 2 while the stopper mechanism 7 (described later) is keeping the ejection ports 20 of the injection container unit 2 open. Meanwhile, the sealing air supply section 65a supplies air to the sealing body 61 to cause the sealing body 61 to inflate. Then, the inflated sealing body 61 hermetically closes the injection container unit 2. While the inflated sealing body 61 is in this state, the ejection air supply section 65b supplies air into the injection container unit 2, and thereby the foamed mixed material is ejected from the injection container unit 2 through the ejection ports 20. The sealing air supply section 65a and the ejection air supply section 65b supply air at different points in time. Note that the sealing air supply section 65a supplies air with a higher pressure than that of air from the ejection air supply section 65b.

The ejection air supply section 65b includes, in the lid member 60, a port and a pressure gauge (which are not illustrated). The port has coupled thereto a compressed air supply device via a hose, a flowmeter, and a three-way valve. The compressed air supply device is capable of supplying compressed air into the injection container unit 2 via the flowmeter, the three-way valve, the hose, and the port. The pressure gauge measures the pressure inside the injection container unit 2.

The ejection air supply section 65b also includes an air supply control section connected to the pressure gauge, the flowmeter, the three-way valve, and the compressed air supply device. The air supply control section controls the operations of the compressed air supply device and the three-way valve.

The vertically driving mechanism 3 is a mechanism to cause the lid member 60 to move up and down along the depth direction of the injection container unit 2. The vertically driving mechanism 3 is capable of causing the injection container unit 2 to move up and down together with the lid member 60, as necessary. Note that the vertically driving mechanism 3 causes the lid member 60 and the stirring mechanism 5 to move up and down always together.

The vertically driving mechanism 3 includes (i) a cylinder 30a and a rod 30b arranged such that their axes are parallel to the direction connecting the top and bottom of the apparatus and (ii) a drive servomotor (not illustrated) for vertical driving. The bottom end of the rod 30b is connected to the lid member 60 and the stirring mechanism 5. With this configuration, when the drive servomotor operates, the lid member 60 and the stirring mechanism 5 move together in a direction toward the bottom of the injection container unit 2 or the opposite direction. In other words, the lid member 60 and the stirring mechanism 5 move along the direction connecting the top and bottom of the apparatus. The drive servomotor is connected to a vertical movement control section (not illustrated).

The connector unit 4 includes one or more container clamping mechanisms 40 which connect and disconnect the vertically driving mechanism 3, the lid member 60, and the stirring mechanism 5 to and from the injection container unit 2. The connection is achieved by the clamping pins 43 of the container clamping mechanisms 40 being inserted into the holes 28a in the clamping bushes 28 connected to the upper flange 27 of the upper unit 22 of the injection container unit 2. Thus, the connector unit 4 is comprised of the container clamping mechanisms 40 and the clamping bushes 28. The connector unit 4 has the lower end of the rod 30b of the vertically driving mechanism 3 connected and fixed to the top thereof. The connector unit 4 includes one or more block-like members 4a in a lower part thereof, and the block-like members 4a have the lid member 60 connected and fixed thereto. As illustrated in FIGS. 1 and 2, the block-like members 4a are located at two positions opposite each other with the stirring shaft 53 of the stirring mechanism 5 between them. The block-like members 4a have the respective container clamping mechanisms 40 connected thereto.

Each container clamping mechanism 40 includes, as illustrated in FIG. 2, (i) a clamping cylinder 44 having a rod 41, (ii) a clamping base 42, and (ii) clamping pins 43. The container clamping mechanism 40 is connected to a corresponding block-like member 4a fixed to the lid member 60, and the rod 41 (FIG. 2) is borne in the block-like member 4a. The rod 41 has the clamping base 42 connected to an end thereof, and the clamping base 42 has thereon the clamping pins 43 borne in the block-like member 4a. There are two such clamping bases 42. Each of the two clamping bases 42 is provided with two clamping pins 43 arranged in parallel to each other.

The projecting end of each clamping pin 43 is inserted into a corresponding hole 28a in a corresponding clamping bush 28 connected to the upper flange 27 of the upper unit 22 of the injection container unit 2. The clamping bushes 28 are located at two positions along the circumferential direction of the upper flange 27 so as to correspond to the respective container clamping mechanisms 40. Each of the clamping bushes 28 has two holes 28a.

The clamping cylinder 44 is capable of moving the clamping base 42 by moving the rod 41. With this, the clamping pins 43 projecting from the clamping base 42 advance or move back along the direction in which the clamping pins 43 project, and, thereby, the clamping pins 43 are inserted into the holes 28a or removed from the holes 28a (withdrawn from the holes 28a). The clamping cylinder 44 is controlled by a clamping control section (not illustrated) to insert or remove the clamping pins 43 into or from the holes 28a. The insertion of the clamping pins 43 into the holes 28a makes the injection container unit 2 and the lid member 60 connected together. With this configuration, when the lid member 60 is caused to move up or down by the vertically driving mechanism 3, the injection container unit 2 also moves up or down.

As illustrated in FIG. 2, the stopper mechanism 7 includes one or more stoppers 7a for blocking the ejection ports 20 of the lower unit 21 of the injection container unit 2. The stoppers 7a project upward from the stopper plate 7b, which is disposed horizontally. The stopper mechanism 7 is configured to be caused, by a mechanism (not illustrated), to move sideways in FIG. 2 (horizontally).

The mold 11 is provided below the molding machine 1, as illustrated in (iii) of FIG. 5. The mold 11 is configured to form a mold by molding a foamed mixed material mixed by the stirring mechanism 5 into a predetermined shape. The mold 11 has therein one or more through-holes 11a through which the foamed mixed material is filled into the mold 11 (such holes are hereinafter referred to as "through-holes 11a" for short). The through-holes 11a are to be located in alignment with the ejection ports 20 of the injection container unit 2. The molding machine 1 also includes a mold extruding mechanism (not illustrated) for removing the mold from the mold 11 by opening the mold 11.

(3) How Molding Machine 1 Operates

The following description will discuss how the molding machine 1 operates. A state in which a foamed mixed material is accommodated in the molding machine 1 is discussed first. The foamed mixed material is not illustrated in FIGS. 5 and 6.

Figure 5:
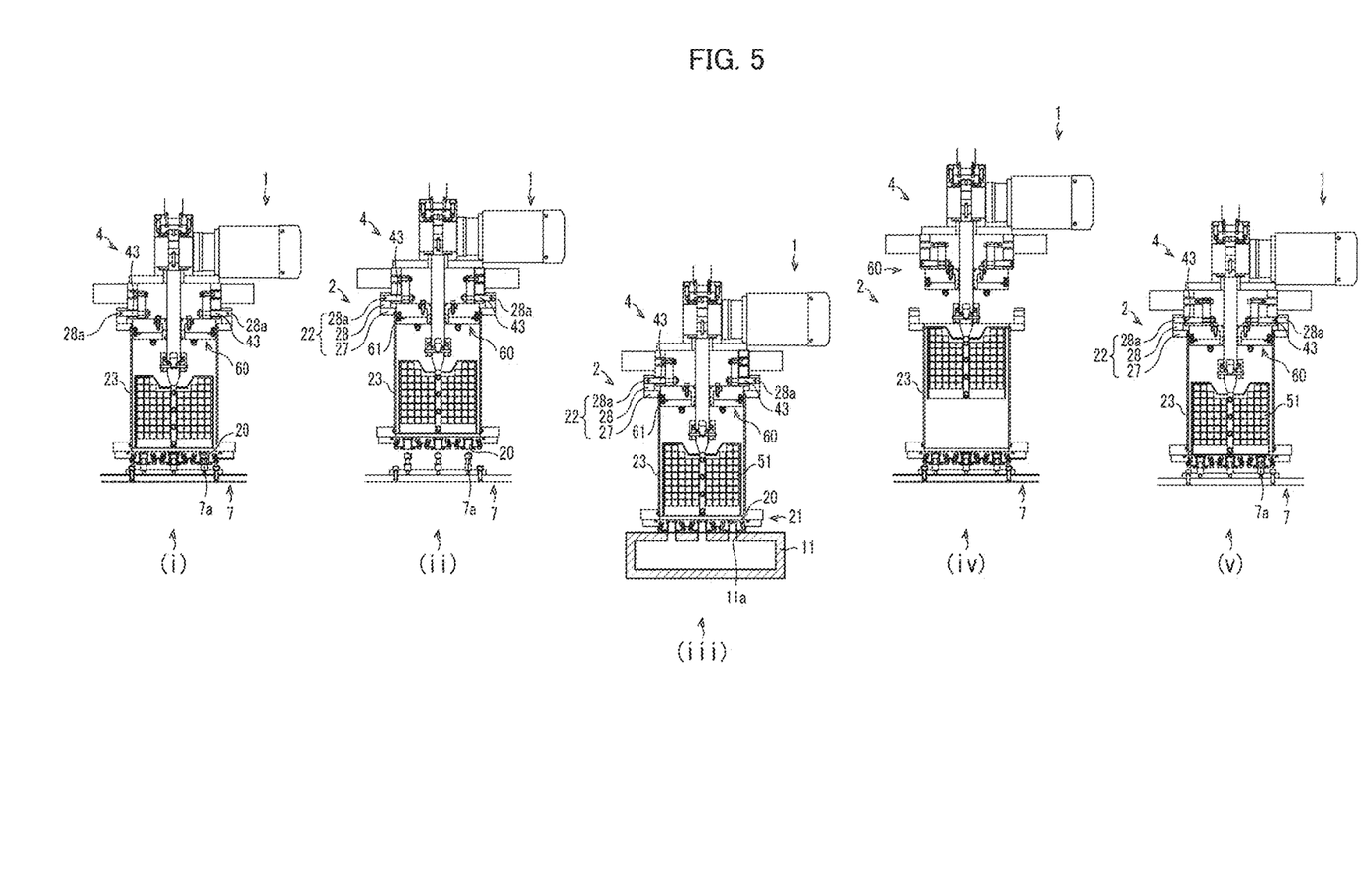
FIG. 5 schematically illustrates an example of how the molding machine illustrated in FIG. 1 operates.

First, (i) of FIG. 5 illustrates a state in which the foamed mixed material is accommodated in the molding machine 1 and the opening at the top of the injection container unit 2 is closed with the lid member 60. The clamping pins 43 are inserted in the holes 28a of the clamping bushes 28, and the lid member 60 and the injection container unit 2 are connected together. The sealing body 61 on the lid member 60 is not hermetically closing the opening at the top of the injection container unit 2. The ejection ports 20 are blocked with the stoppers 7a.

Next, the stoppers 7a, which are blocking the ejection ports 20, are removed. Specifically, the lid member 60 and the injection container unit 2, which are connected together as illustrated in (i) of FIG. 5, ascend and thereby the stoppers 7a are removed from the ejection ports 20. The resulting state is illustrated in (ii) of FIG. 5. In the state illustrated in (ii) of FIG. 5, the stopper mechanism 7 can be moved horizontally and can thereby be withdrawn from the space directly below the injection container unit 2.

Next, an ejection step is carried out. This step involves ejecting the foamed mixed material from the injection container unit 2 having its ejection ports 20 open. Specifically, the stoppers 7a are moved horizontally from the state illustrated in (ii) of FIG. 5, the injection container unit 2 is caused to descend so as to reside on top of the mold 11, and the ejection ports 20 of the injection container unit 2 are placed in alignment with the through-holes 11a of the mold 11. The resulting state is illustrated in (iii) of FIG. 5. In the ejection step, air is supplied from the ejection air supply section 65b into the injection container unit 2. The foamed mixed material in the injection container unit 2 is filled into the cavity of the mold 11 through the ejection ports 20. The mold 11 has been heated by a heating means (not illustrated), and therefore the foamed mixed material in the cavity solidifies with heat.

Note that, before the ejection is carried out, whether the sealing body 61 is properly in close contact with the inner circumferential surface of the injection container unit 2 is determined. That is, whether the opening of the injection container unit 2 is hermetically closed or not is determined. Specifically, the determination is carried out by (i) measuring the pressure of air supplied from the sealing air supply section 65a to the sealing body 61; and (ii) determining whether or not the measured value is equal to or greater than a threshold. If the measured value is equal to or greater than the threshold, this means that the sealing body 61 is properly in close contact with the inner circumferential surface of the injection container unit 2. On the contrary, if the measured value is less than the threshold, this means the likelihood that, for example, air is leaking from the sealing body 61. In a case where the measured value remains less than the threshold for a predetermined period of time from the start of the supply, an error notification is provided. In this case, maintenance is carried out such as a checkup of the sealing body 61 or replacing the sealing body 61 with another one.

Upon completion of the ejection step, the injection container unit 2, the lid member 60, and the stirring mechanism 5 are caused to ascend from the state illustrated in (iii) of FIG. 5 together toward the zenith so that the stoppers can travel below the injection container unit 2. Then, the stopper mechanism 7 moves to the space directly below the injection container unit 2 as illustrated in (ii) of FIG. 5, the injection container unit 2, the lid member 60, and the stirring mechanism 5 are caused to descend, and the stoppers 7a are inserted into the ejection ports 20 as illustrated in (i) of FIG. 5. Once the state illustrated in (i) of FIG. 5 has been reached, the clamping pins 43 are removed from the holes 28a of the clamping bushes 28, and the injection container unit 2 is disconnected from the lid member 60 and the stirring mechanism 5. Meanwhile, the mold 11 is caused to move out of the space directly below the injection container unit 2. This completes a series of operations concerning ejection. Note that the following configuration may be employed: during an injection step, the injection container unit 2, the lid member 60, and the stirring mechanism 5 are caused to ascend together toward the zenith so that the stoppers can travel below the injection container unit 2, while the mold 11 is heated and the foamed mixed material solidifies with heat.

Next, while the injection container unit 2 resides on the stopper plate 7b, the lid member 60 and the stirring mechanism 5 ascend so that materials can be introduced into the injection container unit 2. The resulting state is illustrated in (iv) of FIG. 5. While the molding machine 1 is in this state, a material introducing step is carried out. This step involves introducing particulate aggregate, a water-soluble binder, a surfactant, and water (these are collectively referred to as materials) into the injection container unit 2. The materials are introduced from a material feeding section(s) (not illustrated) through an inlet in the injection container unit 2 or the opening at the top of the injection container unit 2. After the materials are introduced, the weight of the injection container unit 2 having the materials therein is measured in order to control the amounts of the materials introduced. The weight can be measured with a weighing apparatus mounted on the stopper mechanism 7. At this point in time, neither the lid member 60 nor the stirring blade 51 is in contact with the injection container unit 2; therefore, the weight of the injection container unit 2 having the materials therein can be measured accurately.

Next, the lid member 60 and the stirring mechanism 5 are caused to descend toward the injection container unit 2, and a mixing step is carried out. During the mixing step, the positions of the lid member 60 and the stirring mechanism 5 relative to the injection container unit 2 are such that the clamping pins 43 are located lower than the holes 28a of the clamping bushes 28. This state is illustrated in (v) of FIG. 5. In other words, during mixing (while in the state illustrated in (v) of FIG. 5), the stirring blade 51 is located lower than when it was in the original position (see (i) of FIG. 5) and lower than when clamping operation is carried out (i.e., located closer to the bottom of the container).

Next, upon completion of the mixing, the lid member 60 and the stirring mechanism 5 are caused to ascend until the clamping pins 43 become equal in vertical position to the holes 28a of the clamping bushes 28, and the clamping pins 43 are inserted into the holes 28a of the clamping bushes 28. The resulting state is the state illustrated in (i) of FIG. 5.

The molding machine 1 is capable of repeating an operation cycle which includes the above-described ejection, introduction of materials, weighing, and mixing.

Note that, in a case where maintenance is carried out, the cycle is stopped while the molding machine 1 is in the state illustrated in (i) of FIG. 5, the clamping pins 43 are removed from the holes 28a of the clamping bushes 28, and the injection container unit 2 is detached from the lid member 60 and the stirring mechanism 5. This results in a state in which the injection container unit 2 resides on the stopper plate 7b of the stopper mechanism 7. While the molding machine 1 is in this state, the lid member 60 and the stirring mechanism 5 are caused to ascend. Then, the ascending movement is stopped once a connector 52 (at which the stirring shaft 53 and the stirring blade 51 are connected together) has reached a position above the top end of the injection container unit 2 as illustrated in (vi) of FIG. 6 and workspace has been formed around the connector 52.

Figure 6:
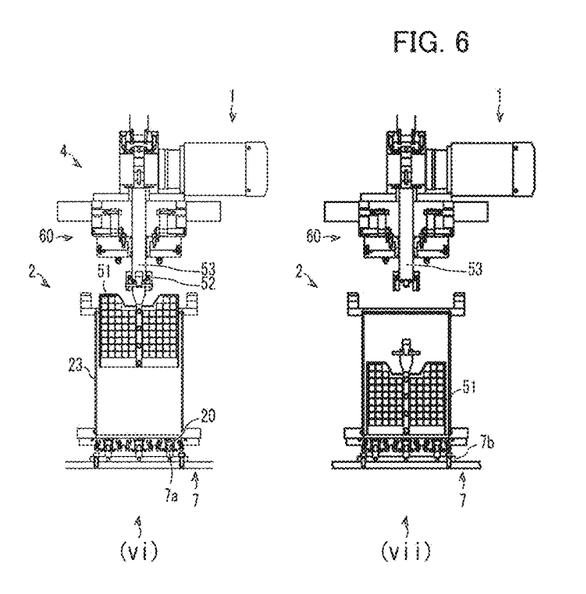
FIG. 6 schematically illustrates the example of how the molding machine illustrated in FIG. 1 operates.

Next, the connector 52 is operated to detach the stirring blade 51 from the stirring shaft 53 as illustrated in (vii) of FIG. 6, and the stirring blade 51 only is accommodated in the injection container unit 2. Since the injection container unit 2 having the stirring blade 51 accommodated therein resides on the stopper plate 7b, the injection container unit 2 can be moved horizontally along with the stopper plate 7b. Maintenance can be carried out, e.g., the injection container unit 2 and the stirring blade 51 can be cleaned, at a position to which the injection container unit 2 has been moved out of the space directly below the connector unit 4. Since the injection container unit 2 is configured to be detached from the lid member 60 and the stirring mechanism 5 as described above, the molding machine 1 dramatically improves maintenance operations. Furthermore, when the stirring blade 51 is configured to be detached as described above, it is not necessary to raise the stirring blade 51 until the bottom end of the stirring blade 51 reaches a position above the top end of the injection container unit 2, making it possible to set the vertical movement range of the stirring mechanism 5 small. It is also possible to reduce the size of the vertically driving mechanism 3.

(4) Effects of the Present Embodiment

The molding machine 1 in accordance with the present embodiment includes the lid member 60, which has the circumferential surface 60a provided with the sealing body 61. In a case where the opening at the top of the injection container unit 2 is to be hermetically closed, the sealing body 61 can be caused to deform (inflate) and thereby the opening can be hermetically closed. In other words, in a case where the opening does not need to be hermetically closed, a clearance can be left between the inner circumferential surface of the injection container unit and the sealing body 61 by not causing such deformation. With this configuration, when the lid member 60 moves up or down, the sealing body 61 does not slide on the inner circumferential surface of the injection container unit. This makes it possible to avoid deterioration resulting from sliding friction between the injection container unit 2 and the lid member 60, and thus possible to prolong the product life of the sealing body 61. It is also possible to reduce the frequency of replacing consumables and reduce the number of man-hours for maintenance.

Furthermore, since the sealing is carried out by causing the sealing body 61 to inflate, the injection container unit 2 and the lid member 60 do not need to be highly accurately centered with each other. In other words, a properly hermetically closed condition can be achieved even if the centering is not very accurate.

Furthermore, since it is not necessary to take into consideration the wear of the injection container unit 2, a transparent material such as acrylic resin can be used. This makes it possible to visually check the behavior of a foamed mixed material during mixing and ejection and to visually check to what degree the sealing is achieved by the sealing body 61. Since the struts 24 increase the rigidity of the injection container unit 2, sufficient strength can be maintained even in a case where a transparent material is used. That is, it is also possible to employ a relatively thin transparent material. Moreover, by using a transparent material to form the lateral part 23 of the injection container unit 2, it is possible to reduce weight compared to when a metal is used. This improves safety in maintenance operations, and also makes it possible to accurately measure the amounts of introduced materials before or after mixing. In addition, the use of a transparent material in forming the lateral part 23 of the injection container unit 2 results in an improvement in workability also when cleaning is carried out after a mold is formed, because the inside of the injection container unit 2 can be visually checked.

Aspects of the present invention can also be expressed as follows:

A molding machine in accordance with Aspect 1 of the present invention includes: an injection container unit configured to store a foamed mixed material; a lid member configured to open and close an opening at a top of the injection container unit; and an air supplying section configured to supply air into the injection container unit to thereby eject the foamed mixed material through an ejection port in the injection container unit, the lid member having a circumferential surface on which a sealing body is provided, the sealing body being configured to (i) inflate when supplied with a fluid and thereby make close contact with an inner circumferential surface of the injection container unit and (ii) detach from the inner circumferential surface of the injection container unit when the fluid stops being supplied.

With the above configuration, by stopping the supply of the fluid and thereby causing the sealing body to detach, it is possible to prevent the sealing body from sliding on the inner circumferential surface of the injection container unit when the injection container unit is closed by fitting the lid member and when the injection container unit is opened by withdrawing the lid member. This makes it possible to prevent wear-related deterioration of the sealing body.

Furthermore, since the molding machine is configured such that the opening at the top of the injection container unit is sealed by causing the sealing body to inflate, the injection container unit can be hermetically closed properly even if the centering between the injection container unit and the lid member is not very accurate.

Furthermore, since the configuration eliminates the need to take into consideration wear of the injection container unit, a transparent material such as acrylic polymer can be used to make the injection container unit. This makes it possible to visually check the behavior of the foamed mixed material during mixing and ejection and to visually check to what degree the sealing is achieved by the sealing body.

If the sealing body slid on the inner circumferential surface of the injection container unit during fitting and withdrawal of the lid member, the pressure inside the injection container unit would change. With the above configuration, however, such changes would not occur because the sealing body detaches from the inner circumferential surface of the injection container unit when the lid member is moved up or down. This makes it possible to achieve good mold forming.

In Aspect 2 of the present invention, the molding machine of Aspect 1 may be arranged such that the injection container unit includes: a lower unit which has the ejection port; an upper unit which is located opposite the lower unit; a lateral part which is present between the lower unit and the upper unit and which is composed of a transparent material; and a plurality of struts which are provided outside the lateral part and which connect the lower unit and the upper unit.

With the above configuration, the rigidity of the injection container unit can be achieved by the lower unit, the upper unit, and the struts. Therefore, the lateral part of the injection container unit can be reduced in thickness, provided that the lateral part can withstand the internal pressure.

By configuring an injection container unit including a lateral part composed of a transparent material, it is possible to reduce the weights of components compared to cases where the injection container unit is entirely composed of metal. This improves safety in maintenance operations, and also makes it possible to accurately measure the amounts of introduced materials before or after mixing. In addition, a configuration of an injection container unit including a lateral part composed of a transparent material results in an improvement in workability also when cleaning is carried out after a mold is formed, because the inside of the injection container unit can be visually checked. This makes it possible to further ensure that a foamed mixed material remaining in the injection container unit is removed.

In Aspect 3 of the present invention, the molding machine of Aspect 1 or 2 may be arranged such that: the sealing body includes (i) a sealing portion which, in cross-section, is convex toward the inner circumferential surface of the injection container unit and (ii) mounting portions located at opposite edges of the sealing portion; and the circumferential surface has a recess which (a) is configured to have the sealing portion placed therein except for a convex portion of the sealing portion such that the convex portion is exposed and (b) is configured to abut on the mounting portions so that the mounting portions are restricted from moving toward the inner circumferential surface of the injection container unit.

With the above configuration, the convex portion of the sealing portion, exposed from the recess in the circumferential surface of the lid member, deforms when supplied with the fluid and makes close contact with the inner circumferential surface of the injection container unit, and, when the fluid stops being supplied, the convex portion detaches from the inner circumferential surface of the injection container unit. Even when the sealing portion deforms in such a manner, the sealing body does not fall out of the recess, because the recess abuts on the mounting portions. This makes it possible to achieve good sealing.

In Aspect 4 of the present invention, the molding machine of any of Aspects 1 to 3 may be arranged such that a spacer is provided between the mounting portions, the spacer being configured to keep the mounting portions away from each other at a predetermined distance.

With the above configuration, it is possible to prevent the mounting portions from excessively deforming toward each other. This makes it possible to prevent the sealing body from falling out of the recess and prevent the sealing body from being displaced. This, in turn, makes it possible to provide a sealing body in which inflation of the sealing portion necessary for sealing is ensured and in which the mountability to the lid member is also improved.

In Aspect 5 of the present invention, the molding machine of any of Aspects 1 to 4 may be arranged such that: the sealing body is made of rubber; and the spacer is composed of a material that is harder than the sealing body.

With the above configuration, since the sealing body is composed of rubber, the sealing body elastically deforms easily, making it possible to easily control the inflation. Even in a case where the sealing body is composed of such an easily elastically deformable material, the displacement of the mounting portions can be prevented or reduced because the spacer is present between the mounting portions.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 molding machine
2 injection container unit
stirring mechanism
ejection port
21 lower unit
22 upper unit
23 lateral part
24 strut
60 lid member
60a circumferential surface
60b recess
61 sealing body
61a sealing portion
61b, 61c mounting portion
63 spacer
65a sealing air supply section
65b ejection air supply section

The invention claimed is:

1. A molding machine comprising:
an injection container unit configured to store a foamed mixed material;
a lid member configured to open and close an opening at a top of the injection container unit; and
an air supplying section configured to supply air into the injection container unit to thereby eject the foamed mixed material through an ejection port in the injection container unit,
the lid member having a circumferential surface on which a sealing body is provided, the sealing body being configured to (i) inflate when supplied with a fluid and thereby make close contact with an inner circumferential surface of the injection container unit and (ii) deflate when the fluid stops being supplied while the sealing body having inflated due to supply of the fluid is in close contact with the inner circumferential surface, and thereby break the close contact and detach from the inner circumferential surface of the injection container unit,
supply of the fluid to the sealing body being stopped while the lid member is being moved in a case of closure, by the lid member, of the opening of the injection container unit and in a case of removal, from the opening, of the lid member having closed the opening of the injection container, the lid member and the sealing body moving without sliding on the inner circumferential surface of the injection container unit in the closure and in the removal, the lid member including an upper partial member and a lower partial member, the lower partial member having a surface facing toward an inside of the injection container, the upper partial member having a first recess in a first surface of the upper partial member, the lower partial member having a second recess in a second surface of the lower partial member, the first surface and the second surface facing each other, the first recess and the second recess joining together to form a recess on the circumferential surface of the lid member, the sealing body including (i) a sealing portion which, in cross-section, is convex toward the inner circumferential surface of the injection container unit, the sealing portion being exposed on the circumferential surface of the lid member, and (ii) mounting portions located at opposite edges of the sealing portion, the mounting portions abutting on the recess.

2. The molding machine according to claim 1, wherein the injection container unit includes:

a lower unit which has the ejection port;

an upper unit which is located opposite the lower unit;

a lateral part which is present between the lower unit and the upper unit and which is composed of a transparent material; and a plurality of struts which are provided outside the lateral part and which connect the lower unit and the upper unit.

3. The molding machine according to claim 1, wherein the circumferential surface of the lid member has the recess configured to have the sealing portion placed therein except for a convex portion of the sealing portion such that the convex portion is exposed, and the recess is configured to abut on the mounting portions so that the mounting portions are restricted from moving toward the inner circumferential surface of the injection container unit.

4. The molding machine according to claim 3, wherein a spacer is provided between the mounting portions, the spacer being configured to keep the mounting portions away from each other at a predetermined distance.

5. The molding machine according to claim 4, wherein:

the sealing body is made of rubber; and the spacer is composed of a material that is harder than the sealing body.

\* \* \* \* \*